United States Patent
Naydenov

(10) Patent No.: US 11,447,717 B2
(45) Date of Patent: Sep. 20, 2022

(54) CONTINUOUS FRACTIONATION OF CRUDE TALL OIL TO REFINED TALL DIESEL

(71) Applicant: SUNPINE AB, Piteå (SE)

(72) Inventor: Valeri Naydenov, Luleå (SE)

(73) Assignee: SUNPINE AB, Pitea (SE)

( * ) Notice: Subject to any disclaimer, the term of this patent is extended or adjusted under 35 U.S.C. 154(b) by 0 days.

(21) Appl. No.: 17/290,269

(22) PCT Filed: Oct. 21, 2019

(86) PCT No.: PCT/SE2019/051027
§ 371 (c)(1),
(2) Date: Apr. 30, 2021

(87) PCT Pub. No.: WO2020/091651
PCT Pub. Date: May 7, 2020

(65) Prior Publication Data
US 2022/0017840 A1    Jan. 20, 2022

(30) Foreign Application Priority Data

Oct. 31, 2018  (SE) .................................. 1851356-4

(51) Int. Cl.
*C11B 13/00* (2006.01)
*B01D 11/04* (2006.01)
(Continued)

(52) U.S. Cl.
CPC ............ *C11B 13/005* (2013.01); *B01D 3/148* (2013.01); *B01D 3/16* (2013.01); *B01D 3/32* (2013.01);
(Continued)

(58) Field of Classification Search
CPC ...... B01D 11/0492; B01D 3/148; B01D 3/16; B01D 3/32; B01D 5/0027; B01D 5/006;
(Continued)

(56) References Cited

U.S. PATENT DOCUMENTS 3,277,072 A   10/1966  Patrick et al.
3,644,179 A    2/1972  Knoer et al.
(Continued)

FOREIGN PATENT DOCUMENTS

EP    1568760 A1    8/2005
EP    3127581 A1    2/2017
(Continued)

OTHER PUBLICATIONS

International Search Report, International application No. PCT/SE2019/051027, dated Jan. 27, 2020.
(Continued)

*Primary Examiner* — Ellen M McAvoy
*Assistant Examiner* — Chantel L Graham
(74) *Attorney, Agent, or Firm* — Moser Taboada

(57) ABSTRACT

The present invention describes a process for continuous fractionation of CTO (crude tall oil) to RTD (refined tall diesel), said process comprising:—when removing a stream of TOP (tall oil pitch) the CTO is fed through at least two evaporation zones arranged in series so that one stream of CTO is fed from a first evaporation zone to a second evaporation zone, wherein a TOP stream is produced and fed from the second evaporation zone, wherein a first vapor stream is produced within the first evaporation zone and a second vapor stream is produced within the second evaporation zone and wherein there is a temperature difference of at least 10° C. between the first vapor stream and the second vapor stream; and—feeding the first vapor stream and the second vapor stream into a subsequent fractionation column to produce a stream of RTD from the fractionation column, wherein the first vapor stream and the second vapor stream are being fed to different positions, relative to the column height, in the fractionation column, where different conditions are applied to ensure suitable fractionations of a more (Continued)

fatty acid rich material and a more rosin rich material, respectively, and which different positions in the fractionation column are separated by packing means.

24 Claims, 1 Drawing Sheet

(51) Int. Cl.
*B01D 3/14* (2006.01)
*B01D 3/16* (2006.01)
*B01D 3/32* (2006.01)
*B01D 5/00* (2006.01)
*C10L 1/02* (2006.01)
*C10L 1/18* (2006.01)
*C10L 1/188* (2006.01)

(52) U.S. Cl.
CPC ........... *B01D 5/006* (2013.01); *B01D 5/0027* (2013.01); *B01D 11/0492* (2013.01); *C10L 1/026* (2013.01); *C10L 1/1802* (2013.01); *C10L 1/1888* (2013.01); *C10L 2200/0476* (2013.01); *C10L 2270/026* (2013.01); *C10L 2290/543* (2013.01)

(58) Field of Classification Search
CPC ...... C10L 1/026; C10L 1/1802; C10L 1/1888; C10L 2200/0476; C10L 2270/026; C10L 2290/543; D21C 11/00; Y02E 50/10; Y02W 30/74; C11B 13/005; C11B 3/12
See application file for complete search history.

(56) References Cited

U.S. PATENT DOCUMENTS

| 7,172,686 | B1 | 2/2007 | Ji et al. | |
|---|---|---|---|---|
| 8,986,536 | B2 | 3/2015 | Joshi | |
| 2014/0309382 | A1* | 10/2014 | Bhandarkar | B01J 19/1818 526/65 |
| 2015/0353866 | A1* | 12/2015 | Stigsson | C11B 13/005 562/404 |

FOREIGN PATENT DOCUMENTS

| EP | 3594317 A1 | 1/2020 |
|---|---|---|
| GB | 1051855 A | 3/1963 |
| SE | 1351563 A1 | 6/2014 |
| WO | WO-2009125072 A1 | 10/2009 |
| WO | WO-2009131510 A1 | 10/2009 |
| WO | WO-2012069704 A1 | 5/2012 |
| WO | WO-2013107738 A1 | 7/2013 |
| WO | WO-2014098692 A1 | 6/2014 |
| WO | WO-2014098763 A1 | 6/2014 |

OTHER PUBLICATIONS

Joye et al., "Resin Acid Composition of Pine Oleoresins" In: J. Chem. Eng. Data, 1967, Apr., vol. 12, No. 2, pp. 279-282.; whole document.

Holmbom "The Behavior of Resin Acids during Tall Oil Distillation" In: J. Am. Oil Chem. Soc., 1978, vol. 55, No. 12, pp. 876-880.; whole document.

Herman et al. "Retrofitting of Tall Oil Distillation". 195-202, International Tall Oil Symposium, IMATRA/Finland, Jun. 7-9, 1983.

Zinkel et al. "Naval Stores-Production, Chemistry, Utilization", Pulp Chemical Association. Library of Congress. 1989.

Kister, H.Z. (1992). Distillation Design (1st ed.). McGraw-Hill; ISBN 0-07-034909-6; sid. 97-110.

Norlin et al. "Tall Oil", Wiley-VCH Verlag GmbH & Co. KGaA, Weinheim, 2005.

Suomen Kemianteollisuus, [Finland's Chemical Industry—oversatt till engelska], Utgivet av: Kyosti Riistama, Jorma Laitinen, Merja Vuori. Chemas Oy, ISBN 952-9597-54-1. 2005.

Affidavit dated Mar. 5, 2021 by Ville Nevanlinna.

FOR90 Product Datasheet, Forchem Oy, 2015, Nov. Retrieved from the Internet: Feb. 12, 2020 https://www.forchem.com/wp-content/uploads/2019/12/forchem_datasheet_FOR90_007.pdf; whole document.

Swedish Search Report for application No. 1951007-2 dated Feb. 26, 2020.

Opposition filed with Swedish Patent Office for application No. SE 542596, dated Mar. 10, 2021.

* cited by examiner

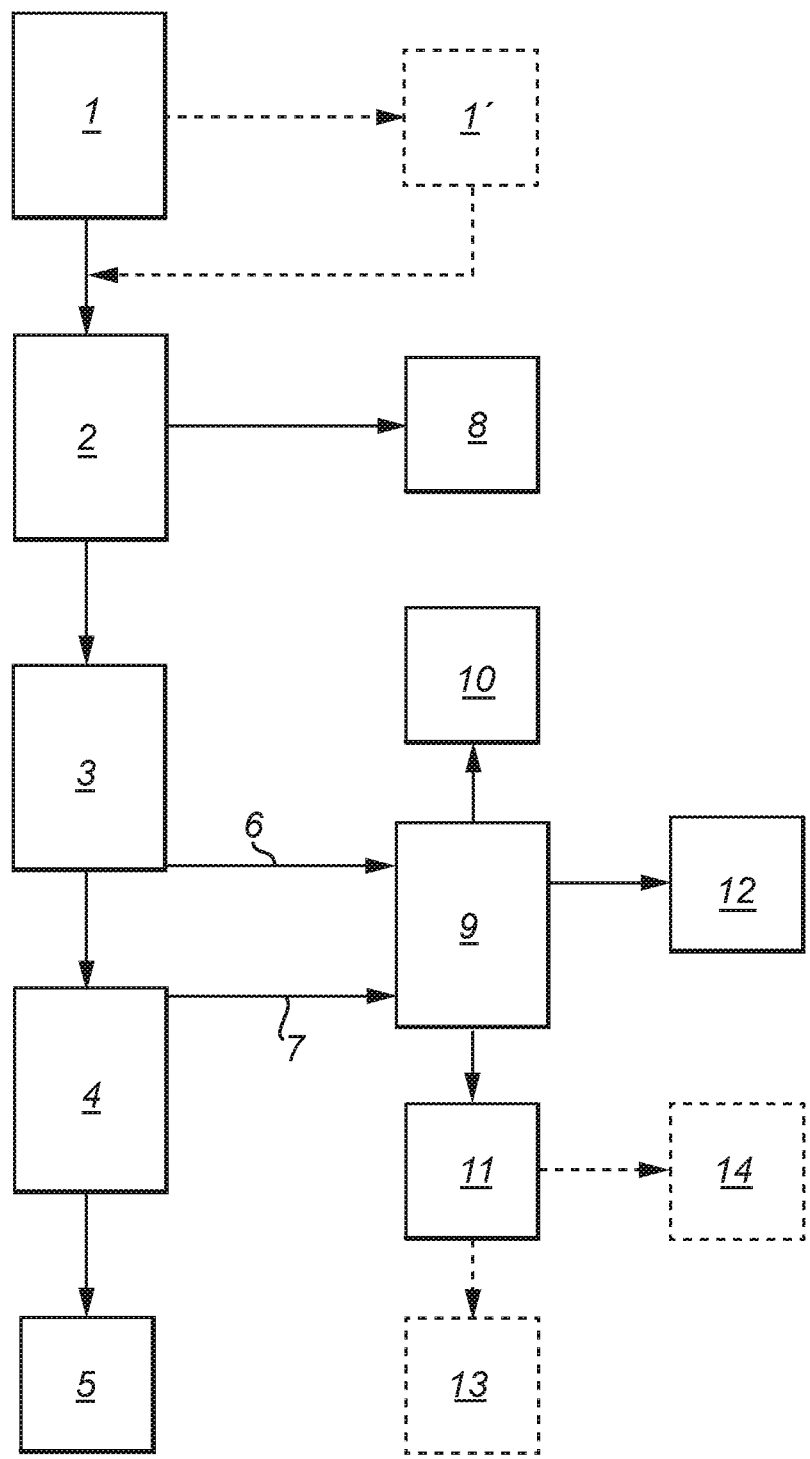

CONTINUOUS FRACTIONATION OF CRUDE TALL OIL TO REFINED TALL DIESEL

FIELD OF THE INVENTION

The present invention relates to continuous fractionation of CTO (crude tall oil) to RTD (refined tall diesel).

TECHNICAL BACKGROUND

The term Crude Tall Oil, in the following CTO, refers to a by-product stream obtained during pulping of wood in the Kraft pulping process. The name tall oil (TO) originated as anglicization of Swedish "tallolja" ("pine oil"). The TO comprises of fraction having acidic properties (—COOH functional group) typically about 75-80 wt. % and neutral fraction up to 25 wt. %. The latter fraction is often referred to as unsaponifiable fraction. The unsaponifiable fraction comprises of wide spectrum of components such as hydrocarbons, fatty alcohols, phytosterol-type alcohols, aldehydes, etc. as well as high molecular weight components originating from internal reactions between constituents of acidic and neutral fractions. The fraction comprised of components with acidic functionality on the other hand, can be further subdivided into two large fractions namely, (i) fatty acids fraction and (ii) rosin acids fraction each containing a number of individual components. From this description of the tall oil composition it is obvious that the CTO represents an attractive pool of renewable fine chemicals, which are nowadays gaining much attention in view of stringent environmental regulations and rising prices of fossil oils.

At present, CTO fractionation is done typically by vacuum distillation. The objectives are rather straight forward, to split the CTO into two fraction (i) acidic fraction up to 75 wt. % and (ii) fraction of less importance called tall oil pitch (TOP). The acidic fraction is further processed in a sequence of fractionation towers operating at high temperatures and relatively high vacuum to obtain streams enriched in fatty acids (tall oil fatty acids, TOFA), rosin acids (tall oil rosin acids, TOR) and distilled tall oil (DTO).

Typically, the TOP is returned to the pulp mills and utilized as internal fuel or fired as biofuel in heat and power plants. It is important to minimize the fraction of TOP produced within CTO refining processes and the present invention is directed to an energy efficient process for CTO refining with high yield of valuable chemicals and biofuels for automotive use.

One process for the refining of CTO is described in WO2014/098763. WO2014/098763 discloses a process for refining of crude tall oil (CTO), said process comprising fractionation under vacuum of a refined CTO into at least one stream of refined tall diesel (RTD) or tall oil fatty acids (TOFA), the RTD or TOFA comprising from 2-30% by volume of rosin acids and from 20-90% by volume of fatty acids, and at least one stream of rosin acid(s) (RA) comprising less than 5% by volume of fatty acids. The stream of RTD or TOFA is deoxygenated forming hydrocarbon compounds in a subsequent step.

One aim of the present invention is to provide an improved process and system for continuous fractionation of CTO to RTD where the energy usage is lowered and optimized and where the total yield is increased.

SUMMARY OF THE INVENTION

The stated purpose above is achieved by a process for continuous fractionation of CTO (crude tall oil) to RTD (refined tall diesel), said process comprising:

when removing a stream of TOP (tall oil pitch) the CTO is fed through at least two evaporation zones arranged in series so that one stream of CTO is fed from a first evaporation zone to a second evaporation zone, wherein a TOP stream is produced and fed from the second evaporation zone, wherein a first vapor stream is produced within the first evaporation zone and a second vapor stream is produced within the second evaporation zone and wherein there is a temperature difference of at least 10° C. between the first vapor stream and the second vapor stream; and feeding the first vapor stream and the second vapor stream into a subsequent fractionation column to produce a stream of RTD from the fractionation column, wherein the first vapor stream and the second vapor stream are being fed to different positions, relative to the column height, in the fractionation column, where different conditions are applied to ensure suitable fractionations of a more fatty acid rich material and a more rosin rich material, respectively, and which different positions in the fractionation column are separated by packing means, such as structured packing.

The core of the present invention refers to ensuring that two vapor streams produced within the different evaporation zones, said two vapor streams having a temperature difference of a t least 10° C., are fed to a subsequent fractionation column at different positions relative to the column height, which are separated from each other by packing means (structured packing). We have surprisingly found that applying this innovative arrangement within the present invention provides means for reducing the energy needed for fractionation. Furthermore, as the present invention enables the use of lower processing temperatures, which is particularly advantageous when treating heat sensitive components, it provides means for an improved total yield. Yet another advantage in applying the arrangement of the present invention is not only to allow for an improved total yield but also to produce a higher quality composition of the products out from the fractionation column as the rate of the degradation reactions of valuable components is decreased with the use of lower processing temperatures. The utilization of an arrangement with two evaporation zones provides two evaporation streams, where the profile of the first vapor stream, comparatively speaking, is fatty acid rich, and the profile of second vapor stream is rosin rich. To take advantage of this preliminary separation these two vapor streams are then sent to a subsequent fractionation column at two different positions relative to the column height, where different conditions are applied to ensure suitable fractionations of a more fatty acid rich material and a more rosin rich material, respectively. Based on this, according to one specific embodiment of the present invention, the first vapor stream and the second vapor stream, respectively, are sent into the column to different positions, relative to the column height, which holds similar compositions as in the first vapor stream and the second vapor stream, respectively. Moreover, according to another embodiment of the present invention, the first vapor stream is a fatty acid rich stream and the second vapor stream is a rosin rich stream.

The technical effect of this innovative arrangement is that the first vapor stream rich in fatty acids is sent into the column section holding similar composition and where the targeted vapor/liquid equilibrium for further fractionation are already established. The same is valid for the entry point of the second vapor stream which is sent into the column section holding similar composition and where the targeted vapor/liquid equilibrium for further fractionation are already established. Thus, within the respective column sections, the streams are directly exposed to fractionation without disturbing the temperature and compositional gradients at the respective column heights hence eliminating the need of temperature adjustment either applying heat or cooling down which in turn leads to energy savings. One alternative to the arrangement in the present invention is to combine the two vapors before or within the column but losing the advantage of the preliminary separation within the two evaporation zones and hence the need for an additional energy to get fractionation going. Another alternative is to send the two vapors to two separate columns hence increasing the capital cost of the unit and very likely increasing the energy consumption because of operating at least one additional unit. Yet, another alternative is to condense the vapors and feed these either separate or combined in fractionation column(s). The negative effects of this alternative are (i) product quality deterioration as the repetitive exposure of the valuable components to high temperature during re-evaporation; (ii) decrease of the total yield as result of (i); (iii) the use of an additional energy to re-evaporate the material and (iv) an increased capital costs for vapor condensation, transportation via pumping, additional pipping, etc. Thus, the arrangement within the present invention solves all problems and avoids the negative effects associated with these alternative approaches while keeping the energy consumption required for the fraction to a minimum and improving both total yield and quality of the valuable components.

Moreover, employing two evaporation zones in series enables greater flexibility towards CTO feed of varying compositions. Thus, for the processing of CTO with higher fatty acid content more energy can be supplied within the first evaporation zone whereas for the processing of the CTO with high rosin acid content more energy would be supplied within the second evaporation zone.

Moreover, employing two evaporation zones in series enables for more efficient utilization of the energy needed for the vaporization of valuable CTO components as well as considerably lowering the peak temperatures of the heat transfer media used for energy supply within the evaporation zones. The use of lower peak temperatures minimizes the unwanted thermal decomposition of the valuable CTO components, thus decreasing the total yield.

Moreover, it may be said that the temperature of second vapor stream is intended to be a higher than the temperature of first vapor stream according to the present invention.

Furthermore, the structured packing means may suitably be a corrugated metal plates or gauzes forcing the fluids and vapors to take complicated paths through the column thus maximizing the contact area between different phases liquid/vapor. Furthermore, and as may be understood from FIG. 1, the first and second vapor streams are sent to one and the same fractionation column to enable continuous production of RTD.

The energy needed within the fractionation column is provided by a re-boiler where suitable process units are such characterized by short residence time, for example but not limited to a thin-film evaporator, falling-film evaporator, etc.

Moreover, it may be said that the design according to the present invention provides means for substantial decrease in the rate of decomposition for valuable CTO components hence ultimately leading to an increase of the total yield. It is well known within the art that the double bonds of fatty acids and carboxylic functionality of the rosin acids are heat sensitive and the sensitivity is further promoted by the presence of various CTO impurities, such as residual mineral acid remaining from the CTO production, metal contaminants, etc. As it will be disclosed later in one specific embodiment of the present invention, the CTO impurities may be removed by a pre-treatment step. Whereas the pre-treatment removes the promotors for thermal decomposition, the specific design according to the present invention with two vapor streams fed and kept separately into a fractionation column to produce RTD enables the substantial decrease in the re-boiler temperature and such a decrease lowers the rate of thermal decomposition of valuable CTO components hence increasing the total yield.

It may be said that in WO2014/098763 it is mentioned to use two thin-film evaporators in series so that a stream from the first thin-film evaporator unit may be combined with the similar stream from a second thin-film evaporator unit into the fractionation tower, where RTD and RA (rosin acid) streams are produced. As clearly stated above, the present invention, however, relates to using a process equipment providing at least two evaporation zones in series to produce separate first and second vapor streams with different composition and temperatures and feeding these to different positions, which are separated by structured packing, in the subsequent fractionation column to enable an energy efficient process to produce RTD. The innovative arrangement enables the use of lower re-boiler temperatures which preserves the valuable components from thermal decomposition thus increasing the total yield. This inventive concept in not at all disclosed or hinted in WO2014/098763.

BRIEF DESCRIPTION OF THE DRAWINGS

In FIG. 1 there is shown a schematic sequence of process steps according to one specific embodiment of the present invention.

SPECIFIC EMBODIMENTS OF THE INVENTION

Below specific embodiments of the present invention are disclosed and discussed further.

According to one specific embodiment of the present invention, the process also comprises the production of a rosin rich stream from the fractionation column. One possible example to be produced is CTOR (crude tall oil rosin) stream. The process conditions within the fractionation tower can be optimized so that the CTOR yield is relatively low but the product is characterized with high rosin acid content, high softening point, etc. thus enabling the use of CTOR directly in formulations such as inks, adhesives, rubber, etc. Moreover, according to yet another embodiment of the present invention the conditions within the fractionation column are optimized so that the yield of CTOR is maximized. According to yet another embodiment, the rosin rich stream, e.g. comprising CTOR, is further processed in a separation unit(s) to produce a stream of TOR (tall oil rosin) of superior quality, and possibly also a second stream of TOP. According to one specific embodiment, the separation unit is a thin-film evaporator. Moreover, according to another specific example the separation unit is an additional fractionation column.

The present invention is also directed to a tall oil rosin composition possible to produce according to above. Therefore, according to one specific embodiment, the present invention is directed to a tall oil rosin fraction comprising at least 70 wt. % rosin acid content and maximum 5 wt. % fatty acid content and where the remaining amount is normally so-called neutrals or unsaponifiables.

As should be understood, the tall oil rosin fraction is possible to obtain by the process according to the present invention. Furthermore, according to yet another specific embodiment, the tall oil rosin fraction is further concentrated by being processed in any kind of separation unit. Therefore, according to one specific embodiment of the present invention, the tall oil rosin fraction comprises at least 85 wt. % rosin acid content and maximum 5 wt. % fatty acid content.

According to yet another specific embodiment of the present invention, the total content of palustric acid, abietic acid and neoabietic acid is at least 55 wt. %. These so-called PAN acids are important because the total content thereof specifies the reactivity of the rosin fraction, because the PAN acids are most reactive in comparison to the other rosin acid isomers such as but not limited to pimaric, iso-pimaric, sandaracopimaric, etc. acids. In comparison to known rosin fractions, the present invention provides a higher concentration in the total content of PAN acids. According to yet another specific embodiment of the present invention, the tall oil fraction is further concentrated to a total content of palustric acid, abietic acid and neoabietic acid above 60 wt. %.

The process according to the present invention may also comprise removal of light ends in the CTO performed before fed to the first evaporation zone. The removal of light ends suitably involves removal of water and turpentine, in one, two or several steps. Generally, this can be done in one step, however two steps may be preferred from practical point of view. It may also allow for a more efficient energy utilization/recovery/integration. The removal of water is intended to be close to 100%, and the turpentine removal should be driven to above 80% according to the present invention. The turpentine here is used as a collective term for various components comprised of a skeleton built of up to 15 carbon atoms. Not only hydrocarbons are included in this fraction and also oxygen containing components holding —OH, carbonyl, ether, etc. functionalities can be found therein. The principle components of the turpentine fractions, however, are alpha- and beta-pinene.

According to one specific embodiment, the removal of light ends involves providing a temperature in a point of at least 160° C., e.g. in around or above 180° C. at which point turpentine boils. According to another specific embodiment, water is removed in a first step and turpentine is removed in a second step of the removal of light ends. Therefore, the removal of light ends may involve increasing the temperature in at least two steps to first remove at least water in a first step and then at least turpentine in a second step.

For the removal of light ends, not only the temperature is of relevance but e.g. also the pressure level. The pressure may e.g. be held at a weak vacuum, e.g. in the range of 20-60 mbar. Moreover, the equipment used may vary. Especially for the turpentine removal any equipment providing short diffusion path for the components to be vaporized is preferred, e.g. equipment providing thin-film of the feed over a large heated area. Moreover, any equipment providing short residence time of the material at the high temperatures during the evaporation is also preferred. Furthermore, when the CTO is sufficiently conditioned in a pre-step such as this it ensures stable vacuum conditions downstream e.g. within the first evaporation zone and beyond.

Moreover, the present invention may also comprise a pre-treatment step(s), performed as a first step of the process. Such a pre-treatment may also be performed before the removal of light ends. Therefore, according to one specific embodiment of the present invention, the process also comprises a pre-treatment of the CTO for removal of impurities, such as e.g. fibers, salts, residual inorganic acid, transition metals and/or lignin, said pre-treatment comprising a first pre-treatment step involving a CTO wash and a separation of a first oil phase comprising refined CTO to be further treated in the continuous fractionation and an aqueous phase holding impurities, and a second step involving a separation of a second oil phase from the aqueous phase. To give some examples on possible parameters of this pre-treatment step it may be mentioned that the CTO wash may be performed in a water concentration of below 5 wt. %. Moreover, at least one additive may be added in the first pre-treatment step where the additive targets the removal of metal impurities present in the CTO. Furthermore, the separation of the first pre-treatment step may be performed in a separator unit where the separation is driven by centrifugal force. Moreover, the separation of the second step may be performed by decantation.

The temperature difference of the first and second vapor streams is an important parameter in relation to inter alia the total yield of RTD. According to one specific embodiment of the present invention, the temperature difference between the first vapor stream compared to the second vapor stream is at least 20° C., such as at least 25° C.

According to yet another specific embodiment of the present invention, the process ensures the first and second evaporation zones to operate at vacuum or close to vacuum, such as at 1-20 mbar and preferably 1-10 mbar. Moreover, as the first and the second vapor streams are fed into subsequent fractionation column at two different positions there is a pressure difference between the first and second evaporation zones.

Furthermore, according to yet another specific embodiment of the present invention, the packing means in the fractionation column separating the first vapor stream and the second vapor stream corresponds to at least 3 theoretical stages. As may be understood from above, the core of the present invention is to maintain the differences (temperature, composition etc.) of the first vapor stream compared to the second vapor stream.

Not only RTD and a rosin rich stream, such as CTOR, may be produced in the fractionation column. According to one specific embodiment of the present invention, there is a third vapor stream produced and fed from the fractionation column. This third vapor stream is recovered through condensation. According to one specific embodiment, this third vapor stream is fed to one or more spray condensers. The effective recovery of this vapor stream may be of advantage to ensure as little affect as possible on the operation of the vacuum system. Moreover, the recovered vapor can be combined with RTD to further increase the yield.

As hinted above, also the composition of the first vapor stream and the second vapor stream are different. According to one embodiment of the present invention, the first vapor stream comprises higher levels of fatty acid material than the second vapor stream, and where the second vapor stream comprises higher levels of rosin acid material than the first vapor stream. This implies that over the structured packing separating the first vapor stream from the second vapor stream in the fractionation column there is a fatty acid rich environment and below the structured packing there is a rosin rich environment. Thus, optimizing the conditions within the column together with the arrangement, two separated vapor streams with different compositions, enables fine tuning of the yield and composition of product streams.

The present invention also refers to a system. According to one aspect the present invention provides a system for continuous fractionation of CTO (crude tall oil) to RTD (refined tall diesel), said system comprising:

means providing at least a first evaporation zone and a second evaporation zone connected in a series; and
a fractionation column;
wherein means providing the first evaporation zone and the second evaporation zone is connected through piping to the fractionation column so that connections from the first evaporation zone and the second evaporation zone is made at different positions, relative to the column height, in the fractionation column, which different positions in the fractionation column are separated by packing means.

Moreover, according to one specific embodiment of the present invention, the system comprises one process unit providing the first evaporation zone and another process unit providing the second evaporation zone.

According to another embodiment, the system also comprises another separation unit, positioned after the fractionation column in process terms and connected to the same, for the production of TOR (tall oil rosin) from a rosin rich stream. This separation unit may be any process equipment enabling evaporation e.g. a thin-film evaporator, short-path evaporator, wiped-film evaporator, distillation column or combinations thereof.

Moreover, according to yet another specific embodiment of the present invention, the system also comprises one or more process units for removal of light ends present in the CTO, present before the means providing at least a first evaporation zone and a second evaporation zone in process terms and connected to the same. These light ends are water and turpentine. The system may e.g. comprise one unit for the removal of water and another unit for the removal of turpentine.

Furthermore, the system may also comprise one or more washing and separation units for pre-treatment of the CTO. These are provided before the one or more units for removal of light ends.

Moreover, according to yet another specific embodiment of the present invention, the structured packing in the fractionation column separating the different positions of where the first vapor stream is connected through piping to the fractionation column and where the second vapor stream is connected through piping to the fractionation column corresponds to at least 3 theoretical stages. Feeding two vapor streams different in composition allows for more adequate concentration profile along the column height thus opening for more fine control over the product compositions while maintaining the energy consumption to its minimum.

DETAILED DESCRIPTION OF THE DRAWINGS

FIG. 1 shows a schematic view over one embodiment of a process according to the present invention. In this case the CTO 1 is processed into a section 2 for removal of light ends 8, namely water and turpentine. Regardless of the removal approach i.e. in one or more steps, the water and turpentine are separated from each other and are processed in the same plant or elsewhere. It should be noted that the CTO 1 may in fact be refined CTO 1' which has been pre-treated for removal of impurities by washing and separation (option denoted with a dashed line).

Subsequently to the removal of the light end fractions, the stream is fed to a first evaporation zone 3 where two streams are produced, one first vapor stream 6 fed to the fractionation column 9 through nozzle positioned "higher" relative to the column height and one stream fed to a second evaporation zone. Within the second evaporation zone two streams are produced, one vapor stream 7 fed to the fractionation column through a nozzle positioned "lower" relative to the column height and more specifically under the nozzle of first vapor stream 6, and one TOP stream 5 which is collected and/or further processed in the same plant or elsewhere.

In the fractionation column there is produced a RTD stream 12, a rosin rich stream 11, referred to as CTOR in this case, and a vapor stream 10 which suitably is sent to one or more spray condensers. Optionally, the CTOR is further processed in another separation unit, to yield one stream of TOR 14 and one additional stream of TOP 13, both collected and/or further processed in the same plant or elsewhere.

EXAMPLES

In the following comparative examples 1 and 2 the CTO is continuously fractionated into RTD using two different set-ups.

Within the first set-up, example 1, the first and second vapor streams produced within the respective evaporation zone were fed into the fractionation column using nozzles at the same height and positioned at 180 degrees relative to each other i.e. combined within the column.

Within the second set-up, example 2, the first vapor produced within the first evaporation zone is fed into the fractionation column through a nozzle positioned "higher" relative to the column height and the second vapor produced within the second evaporation zone is fed through a nozzle positioned "lower" relative to the column height. The two vapor streams are separated by a structured packing corresponding to 3 theoretical stages. Besides the structured packing separating the first vapor stream from the second vapor stream within example 2, all other column internals, type of structured packing, distributors, distances between, etc. were kept the same for examples 1 and 2. The energy necessary for fractionation was delivered by a falling-film evaporator. Further, the conditions within the column for both examples were optimized to obtain the same product streams regarding quantity and quality.

Satisfying all the constrains and conditions above showed that the energy delivered by the re-boiler could be reduced by 25% when using the set-up described in example 2. Furthermore, the temperature at the bottom of the column for example 2 was reduced by about 10° C. Using the relationships for thermal decomposition of CTO components described by "Tall Oil: A book on the processing and use of tall oil" compiled and edited by John Drew and Marshall Propst distributed by Pine Chemical Association, one can calculate that decreasing the fractionation temperature by 10° C. decreases the rate of thermal decomposition by more than 30%. Thus, the design according to the present invention provides means for preserving the valuable CTO components which in turn leads to an increase of the total yield for said process.

CONCLUSIONS

As mentioned above, the present invention has several advantages. First of all, the total yield for the processing of CTO is increased. Fact is that the set-up suggested according to the present invention enables that more than 95% of the free fatty acids (FFAs) and more than 90% of the rosin acids are sent to the fraction column. As the streams are separated with one having a high content level of FFA and another one with a high content level of rosin material, the produced compositions and the total yield out from the fractionation column is improved while minimizing the energy consumption compared to similar processes.

Moreover, in relation to quality parameters, the present invention has advantages compared to what is known and used today. By incorporating the two evaporation stages less TOP (tall oil pitch) is sent to the fractionation column. This implies that less heavy components entering the fractionation column thus negatively impacting the color and softening point parameters for CTOR/TOR products.

Furthermore, the use of two evaporation zones according to the present invention in principle discards the necessity of recycling, which in turn has a positive effect on the product quality. As less time at higher temperatures are needed this has a positive effect when both fatty acids and rosin acids are sensitive for high temperatures.

The invention claimed is:

1. A process for continuous fractionation of CTO (crude tall oil) to RTD (refined tall diesel), said process comprising:
    feeding the CTO through a first evaporation zone to produce a first vapor stream and at least one other stream;
    feeding said at least one other stream into a second evaporation zone to produce a second vapor stream and a TOP stream; and
    feeding the first vapor stream and the second vapor stream into a fractionation column; a
    Wherein the first vapor stream and the second vapor stream (i) have a respective temperature difference of at least 10° C. and (ii) are introduced into the fractionation column at different positions in the fractionation column, which positions are separated by packing means.

2. The process according to claim 1, wherein the first vapor stream and the second vapor stream, respectively, are sent into the fractionation column at different positions, relative to the column height, which positions hold similar compositions as in the first vapor stream and the second vapor stream, respectively.

3. The process according to claim 1, wherein the first vapor stream is fatty acid rich and the second vapor stream is rosin rich.

4. The process according to claim 1, further comprising releasing a rosin rich stream from the fractionation column.

5. The process according to claim 4, wherein the rosin rich stream is further processed in at least one separation unit to produce a stream of TOR (tall oil rosin).

6. The process according to claim 5, wherein the rosin rich stream is further processed in at least one separation unit to produce a third TOP stream.

7. The process according to claim 1, further comprising removing light ends from the CTO prior to the first evaporation zone.

8. The process according to claim 7, wherein the removal of light ends involves providing a temperature in a point of at least 160° C.

9. The process according to claim 7, wherein the removal of light ends involves increasing the temperature in two steps to first remove at least water in a first step and then at least turpentine in a second step.

10. The process according to claim 1, further comprising removing impurities from the CTO prior to the first evaporation zone, wherein removal of impurities includes a first pre-treatment step involving a CTO wash and a separation of a first oil phase comprising refined CTO to be further treated in the continuous fractionation and an aqueous phase holding impurities, and a second pre-treatment step involving a separation of a second oil phase from the aqueous phase.

11. The process according to claim 1, wherein the temperature difference in the first vapor stream compared to the second vapor stream is at least 20° C.

12. The process according to claim 1, wherein the first evaporation zone and the second evaporation zone operate at vacuum or close to vacuum and wherein there is a pressure difference in the first evaporation zone compared to the second evaporation zone.

13. The process according to claim 1, wherein the packing means in the fractionation column separating the first vapor stream and the second vapor stream corresponds to at least 3 theoretical stages.

14. The process according to claim 1, wherein a third vapor stream is produced and fed from the fractionation column.

15. The process according to claim 14, wherein the third vapor stream is fed to one or more spray condensers.

16. The process according to claim 1, wherein the first vapor stream comprises higher levels of fatty acid material than the second vapor stream and wherein the second vapor stream comprises higher levels of rosin acid material than the first vapor stream.

17. A system for continuous fractionation of CTO (crude tall oil) to RTD (refined tall diesel), said system comprising:
    means providing at least a first evaporation zone and a second evaporation zone connected in a series; and
    a fractionation column;
    wherein means providing the first evaporation zone and the second evaporation zone is connected through piping to the fractionation column so that connections from the first evaporation zone and the second evaporation zone is made at different positions, relative to the column height, in the fractionation column, where different conditions are applied to ensure suitable fractionations of a more fatty acid rich material and a more rosin rich material, respectively, and which different positions in the fractionation column are separated by packing means.

18. The system according to claim 17, wherein the system comprises one process unit providing the first evaporation zone and another process unit providing the second evaporation zone.

19. The system according to claim 17, wherein the system also comprises another separation unit, positioned after the fractionation column in process terms and connected to the same, for the production of TOR (tall oil rosin) from a rosin rich stream.

20. The system according to claim 17, wherein the system also comprises one or more process units for removal of light ends present in the CTO, present before the means providing at least a first evaporation zone and a second evaporation zone in process terms and connected to the same.

21. The system according to claim 17, wherein the system also comprises one or more washing and separation units for pre-treatment of the CTO.

22. A tall oil rosin fraction comprising at least 85 wt % rosin acid content and maximum 5 wt % fatty acid content.

23. A tall oil rosin fraction according to claim 22, wherein the total content of palustric acid, abietic acid and neoabietic acid is at least 55 wt %.

24. A tall oil rosin fraction according to claim 23, wherein the tall oil fraction is further concentrated to a total content of palustric acid, abietic acid and neoabietic acid above 60 wt %.

* * * * *